United States Patent
Barazovsky

(10) Patent No.: US 10,642,284 B1
(45) Date of Patent: May 5, 2020

(54) LOCATION DETERMINATION USING GROUND STRUCTURES

(71) Applicant: Amazon Technologies, Inc., Seattle, WA (US)

(72) Inventor: Gideon Barazovsky, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/004,174

(22) Filed: Jun. 8, 2018

(51) Int. Cl.
| | |
|---|---|
| *G05D 1/00* | (2006.01) |
| *G05D 3/00* | (2006.01) |
| *G06F 7/00* | (2006.01) |
| *G05D 1/10* | (2006.01) |
| *B64C 39/02* | (2006.01) |
| *G01C 21/00* | (2006.01) |
| *G01S 19/06* | (2010.01) |
| *G01S 19/12* | (2010.01) |
| *G01S 19/40* | (2010.01) |
| *G01S 19/45* | (2010.01) |
| *G06T 7/70* | (2017.01) |

(52) U.S. Cl.
CPC ........... *G05D 1/101* (2013.01); *B64C 39/024* (2013.01); *G01C 21/005* (2013.01); *G01S 19/06* (2013.01); *G01S 19/12* (2013.01); *G01S 19/40* (2013.01); *G01S 19/45* (2013.01); *G06T 7/70* (2017.01); *B64C 2201/122* (2013.01); *B64C 2201/123* (2013.01); *B64C 2201/128* (2013.01); *B64C 2201/145* (2013.01); *G06T 2207/10028* (2013.01); *G06T 2207/10032* (2013.01); *G06T 2207/30181* (2013.01)

(58) Field of Classification Search
CPC ......... G05D 1/101; G01S 19/12; G01S 19/45; G01S 19/06; G01S 19/40; G01C 21/005; B64C 2201/128; B64C 2201/145; B64C 2201/123; B64C 39/024; B64C 2201/122; G06T 2207/30181; G06T 2207/10032; G06T 7/70; G06T 2207/10028
See application file for complete search history.

(56) References Cited

U.S. PATENT DOCUMENTS

| | | | |
|---|---|---|---|
| 9,508,263 B1 * | 11/2016 | Teng | B64C 39/024 |
| 9,513,635 B1 * | 12/2016 | Bethke | G01C 21/20 |
| 10,012,735 B1 * | 7/2018 | Loveland | G01S 19/40 |

(Continued)

*Primary Examiner* — Khoi H Tran
*Assistant Examiner* — Jorge O Peche
(74) *Attorney, Agent, or Firm* — Lee & Hayes, P.C.

(57) ABSTRACT

An unmanned aerial vehicle (UAV) may navigate to place a ground structure, having a known location, into a field of view of a camera and capture imagery of the ground structure. Algorithms may be used to identify the ground structure to determine its known location. Ground structures may include identifiers that provide the known location and/or other information to enable determination of the known locations. Algorithms may determine an offset distance of the UAV from the ground structure to enable determination of a location of the UAV. For example, the images may be used to determine a distance and angle(s) from the ground structure when the ground structure is shown in a perspective view and has features that indicate orientation. In some embodiments, the UAV may transmit its location to other UAVs, and/or may create and/or transmit a corrected GPS location based on the location determined by the ground structure.

20 Claims, 8 Drawing Sheets

(56) References Cited

U.S. PATENT DOCUMENTS

| | | | | |
|---|---|---|---|---|
| 10,102,758 B1* | 10/2018 | Beaurepaire | ......... | G08G 5/0069 |
| 10,137,984 B1* | 11/2018 | Flick | ..................... | B64D 47/00 |
| 10,387,727 B2* | 8/2019 | Abeywardena | ........ | B64D 47/08 |
| 10,475,239 B1* | 11/2019 | Priest | .................... | B64C 39/024 |
| 2014/0166816 A1* | 6/2014 | Levien | ................. | B64C 39/024 |
| | | | | 244/175 |
| 2014/0316616 A1* | 10/2014 | Kugelmass | ............ | G05D 1/101 |
| | | | | 701/8 |
| 2016/0046374 A1* | 2/2016 | Kugelmass | ............ | G05D 1/101 |
| | | | | 701/8 |
| 2016/0253808 A1* | 9/2016 | Metzler | ................ | G05D 1/0094 |
| | | | | 382/103 |
| 2017/0046873 A1* | 2/2017 | Terry | .................. | H04N 13/221 |
| 2017/0110014 A1* | 4/2017 | Teng | ................... | B64C 39/024 |
| 2017/0132943 A1* | 5/2017 | Moon | .................. | H04W 4/029 |
| 2017/0134963 A1* | 5/2017 | Priest | .................... | H04W 16/18 |
| 2017/0192418 A1* | 7/2017 | Bethke | ................. | G05D 1/0094 |
| 2017/0199646 A1* | 7/2017 | Priest | .................... | G06T 17/05 |
| 2017/0215086 A1* | 7/2017 | Priest | .................... | H04W 16/18 |
| 2017/0217589 A1* | 8/2017 | Maekawa | ............. | G05D 1/0094 |
| 2017/0235018 A1* | 8/2017 | Foster | .................... | B64D 45/00 |
| | | | | 702/5 |
| 2017/0248969 A1* | 8/2017 | Ham | ..................... | G05D 1/101 |
| 2017/0257778 A1* | 9/2017 | Priest | ..................... | G06T 17/05 |
| 2017/0318477 A1* | 11/2017 | Priest | .................... | H04N 7/185 |
| 2017/0336806 A1* | 11/2017 | Blanc-Paques | ........ | G08G 5/045 |
| 2017/0337824 A1* | 11/2017 | Chen | .................... | G08G 5/0086 |
| 2018/0002010 A1* | 1/2018 | Bauer | .................. | G08G 5/0034 |
| 2018/0004207 A1* | 1/2018 | Michini | ............... | G05D 1/0094 |
| 2018/0032088 A1* | 2/2018 | van Cruyningen | ... | B64C 39/024 |
| 2018/0041907 A1* | 2/2018 | Terry | .................... | B64C 39/024 |
| 2018/0068187 A1* | 3/2018 | Schultz | ............... | G06F 16/5838 |
| 2018/0075649 A1* | 3/2018 | Godwin | ................ | G06T 19/006 |
| 2018/0095478 A1* | 4/2018 | van Cruyningen | ..... | G01S 19/14 |
| 2018/0204469 A1* | 7/2018 | Moster | ................. | G05D 1/0094 |
| 2018/0211441 A1* | 7/2018 | Priest | ................... | G05D 1/0094 |
| 2018/0232871 A1* | 8/2018 | Terry | .................... | G06T 17/05 |
| 2018/0249343 A1* | 8/2018 | Priest | ................... | G06Q 10/0875 |
| 2018/0255465 A1* | 9/2018 | Priest | .................... | G01C 11/06 |
| 2018/0259652 A1* | 9/2018 | Shimizu | ................ | G01S 17/89 |
| 2019/0002103 A1* | 1/2019 | Gomez Gutierrez | ........ | |
| | | | | H04W 4/023 |
| 2019/0063881 A1* | 2/2019 | Abramov | ............... | G05D 1/104 |
| 2019/0088025 A1* | 3/2019 | Tamanaha | ............... | H04N 5/00 |
| 2019/0129039 A1* | 5/2019 | Schubert | ............... | G01S 17/933 |
| 2019/0145778 A1* | 5/2019 | Huang | .................. | G01C 21/20 |
| | | | | 701/3 |

\* cited by examiner

LOCATION DETERMINATION USING GROUND STRUCTURES

BACKGROUND

Unmanned aerial vehicles (UAVs) vary in degrees of sophistication. For example, a class of UAVs used by hobbyists often rely completely on receipt of control signals from a user-operated remote control device. This class of UAVs relies on user input to provide most or all navigational instructions. A more advanced class of UAVs may exchange control signals and/or other data via established signal sources such as mobile telephone towers. This class of UAVs may receive high level instructions such as waypoints, a destination, and/or other parameters, and may implement logic to navigate through airspace based on the high level instructions and other information accessed by sensors on the UAVs and/or information obtained from the established signal sources. A command station may exchange data with a UAV using a mobile telephone network or other established signal source to exchange information, log events, and for other reasons.

Despite existing systems used to provide location information to vehicles, such as global positioning systems (GPS), these systems are not always accessible to provide input to vehicles. For example, a vehicle may be out of range of some systems, weather may interfere with dissemination of information (e.g., heavy rain, fog, etc.), systems may malfunction, and/or systems may be spoofed. Redundant location systems provide value to compensate when existing systems are not available or to provide corrections to location information from existing systems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
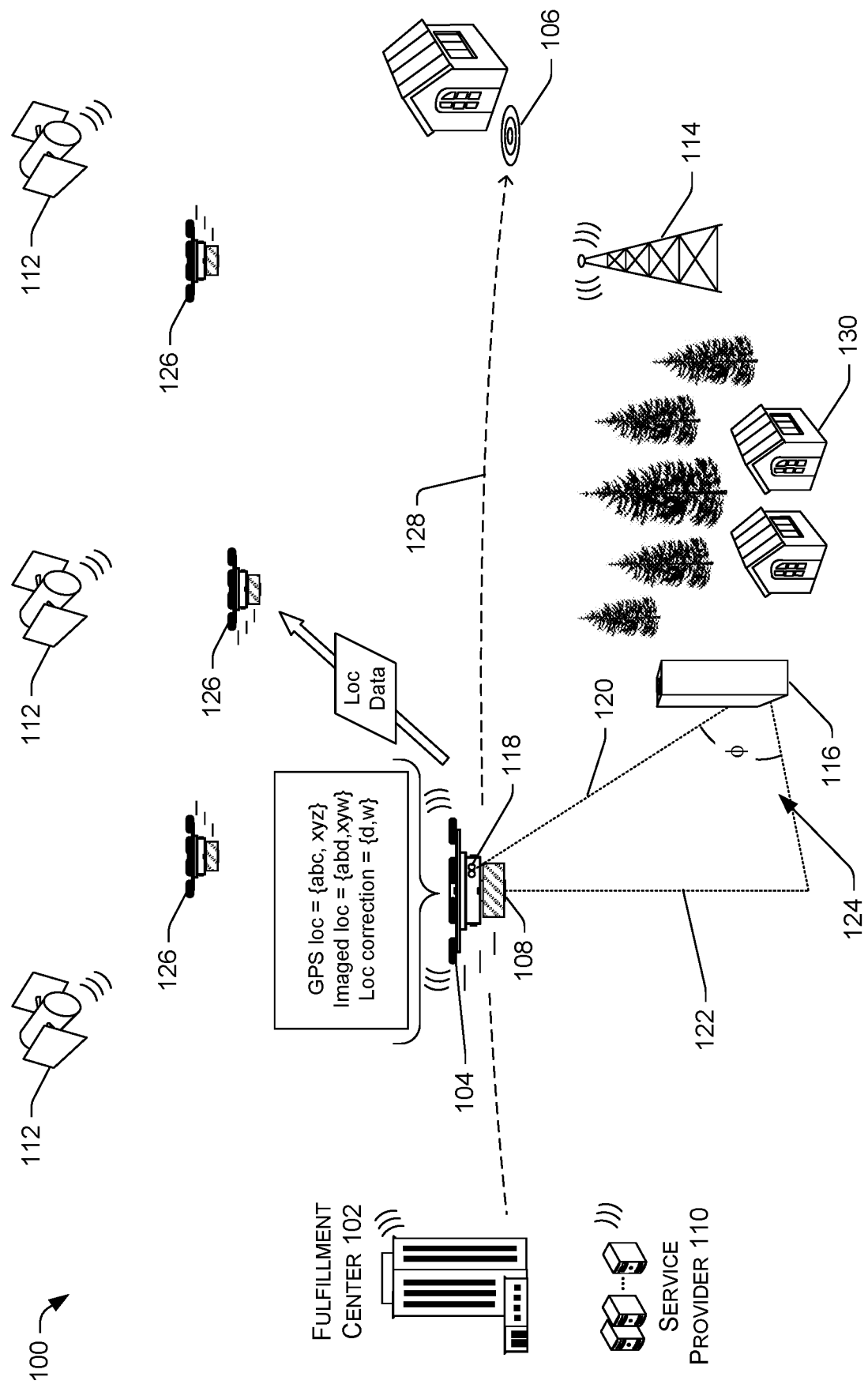
FIG. 1 is a schematic diagram of an illustrative environment that includes an unmanned aerial vehicle (UAV) determining a location based on imaging a ground structure.

This disclosure is directed at least partly to determining a location of a vehicle based at least in part on images of a ground structure having a known location. Conventionally, an unmanned aerial vehicle (UAV) may rely at least partly on global positioning system (GPS) information or other location systems (e.g., radio frequency triangulation, etc.) to determine a location of the UAV.

When GPS is used by a UAV, there may be times when the GPS information is unavailable. As an alternative or complimentary solution, a UAV may determine its location relative a known ground structure that has a known location, such as a latitude and longitude known by the UAV or accessible to the UAV. A simple solution for the UAV to determine its location is to fly directly over the ground structure. When the UAV is directly over the ground structure, which may be confirmed by imagery from the UAV, such as a downward facing imaging device (e.g., a camera), the UAV can be assumed to have the same latitude and longitude as the ground structure. Example ground structures may be unique structures or objects with known locations, such as famous landmarks (e.g., Big Ben, the Eiffel Tower, the Empire State Building, etc.), as well as city infrastructure (e.g., intersection of existing streets, bridges, telephone poles, etc.), natural objects (e.g., a large rock, a large tree, etc.) manmade objects (e.g., markers, etc.) and/or other objects or structures that are stationary and uniquely identifiable by a UAV using an imaging device.

In some embodiments, the UAV may fly near, but not directly over the ground structure and capture imagery of the ground structure. For example, the UAV may position the ground structure within a field of view of the UAV (e.g., of an imaging device, etc.). Image analysis algorithms may be used to identify the ground structure to determine a known location for the ground structure, such as using a look up table. In various embodiments, the ground structures may include identifiers that provide the known location and/or other information to enable the UAV to determine the known location (e.g., an image code, etc.). The image analysis algorithms may determine an offset distance of the UAV from the ground structure, which may enable determination of a location of the UAV. For example, the images may be used to determine a distance and angle(s) from the ground structure when the ground structure is shown in a perspective view and has features that indicate orientation. As an example, a UAV may fly over and near a ground structure having a latitude/longitude of {47° 36' 23" N, 122° 19' 50" W}, to cause the ground structure to be in a field of view of an imaging device. Through image analysis, the offset may be calculated as a latitude/longitude (e.g., {1", 3"}), as a distance (e.g., (34 inches, 48 inches), or using other absolute measurements. Using this system, the UAV may determine a current location of the UAV at a given time (e.g., a temporal location value).

In some instances, GPS information may be subject to error, which could be corrected by a GPS correction value. In accordance with some embodiments, the UAV may determine a GPS location at the same time or near the same time as determining the UAV's location using imagery of a ground structure. The UAV may determine a GPS correction value as a difference between the GPS location and the UAV's location. The GPS correction value may be used by the UAV to correct subsequent GPS locations which at times have error which is generally consistent over short periods of time. The UAV may send (e.g., transmit, broadcast, etc.) the GPS correction value along with a time to one or more other UAVs, which may allow other UAVs near the UAV to use the GPS correction value without having to determine a location of a ground structure as discussed above.

In various embodiments, three or more UAVs may determine their location at or near a given time using known ground structures as described above. These UAVs may communicate their temporal location (e.g., location and time of location) to a different UAV, which may use the information to triangulate a location of the different UAV. As long as three or more UAVs have known locations within a short period of time (often measured in seconds or less), then other UAVs in the area that receive this information can determine their own location based on time of flight of the information from the other UAVs and the content of that information using triangulation location techniques. Of course, other advantages of self locating by UAVs using ground structures are described below.

The techniques, UAVs, and systems described herein may be implemented in a number of ways. Example implementations are provided below with reference to the following figures.

FIG. 1 is a schematic diagram of an illustrative environment 100 that includes a UAV determining a location based on imaging a ground structure. The environment 100 may include a fulfillment center (FC) 102 where a UAV 104 may originate a flight directed to a destination 106, such as a location associated with a recipient of a package (or item) 108 transported by the UAV 104. The UAV 104 may receive some flight information and/or commands from a service provider 110, which may operate as a central command among other tasks. The service provider 110 may communicate with the UAV 104 via one or more wireless network(s), such as a network that utilizes different signal sources. The signal sources may be from traditional mobile telephone towers (antennas), ad hoc antennas, satellites, and/or other sources described herein.

The UAV 104 may determine a location of the UAV 104 using various techniques. At times, the UAV 104 may receive GPS signals from satellites 112 to determine a location of the UAV. At certain times, the UAV 104 may determine a location of the UAV 104 using information from ground transmitters 114 such as antennas.

In accordance with one or more embodiments, the UAV 104 may determine a location of the UAV 104 based in imagery of a ground structure 116 having a known location, such as a known latitude and longitude. The ground structure 116 may be any uniquely identifiable structure or object that is stationary and is associated with a known location. The ground structure 116 may include features that indicate orientation of the ground structure to allow the UAV to determine which side of the ground structure the UAV faces. Therefore, a ground structure shaped as a sphere may not satisfy this objective unless it included unique markings to differentiate different parts of the sphere, such as fiducial marks. In contrast, a historical landmark such as Big Ben may provide a good ground structure since imagery from almost any angle of the ground structure may be used to determine a location of the imaging device, and thus the UAV when the imaging device is coupled to the UAV. In some embodiments, a shadow cast by a member may be used to determine an orientation of the ground structure when a time and general location of the ground structure are known since shadow movement is predictable. For example, a cylindrical structure, such as a grain elevator may cast a shadow, which may be used to determine an offset (distance and angle(s)) of a UAV from a known location of the grain elevator by analyzing the location of the shadow and/or perspective of the grain elevator from imagery of the grain elevator.

To determine a location of the UAV 104, the UAV may fly directly over the ground structure 116 and determine its location at the instant that the UAV is directly over the ground structure 116. However, this may not be practical for many reasons, and may be inefficient by causing the UAV to deviate from a more direct route to the destination 106.

In some embodiments, the UAV 104 may use an imaging device 118 to capture an image of the ground structure 116 while the ground structure is under the UAV, but not necessarily directly under the UAV. The imaging device 118 may be a depth camera, such as a stereo camera pair that is configured to determine a distance from an object, such as the ground structure 116. The imaging device 118 may capture one or more images, which may be analyzed to determine an offset distance from the ground structure. For example, the imaging device may determine a distance 120 from the ground structure, an altitude 122 over the ground structure, and/or an angular offset 122 from the ground structure. The angular offset 124 may be determined from analyzing a perspective view of a three-dimensional shape of the ground structure or by analyzing other direction identifying information, such as markings, indicia, fiducial marks, and so forth. The UAV may determine a location for the UAV by applying the offset to the known location of the ground structure 116. For example, the UAV 104 may fly over and near the ground structure 116 having a latitude/longitude of {47° 36' 23" N, 122° 19' 50" W} to place the ground structure in a field of view of an imaging device. Through image analysis, the offset may be calculated as a latitude/longitude (e.g., {1", 3"}), as a distance (e.g., (34 inches, 48 inches), or using other absolute measurements. Using this system, the UAV 104 may determine a current location of the UAV at a given time (e.g., a temporal location value). The UAV 104 may store the location as an imaged location.

In various embodiments, the UAV 104 may determine a GPS location of the UAV 104 at the same time or near the same time as determining the imaged location using imagery of the ground structure 116. The UAV 104 may then determine a GPS correction value ("loc correction") as a difference between the GPS location and the imaged location. The GPS correction value may be used by the UAV 104 to correct subsequent GPS locations which at times have error which is generally consistent over short periods of time. The UAV 104 may send (e.g., transmit, broadcast, etc.) the GPS correction value along with a time to one or more other UAVs 126, which may allow the other UAVs 126 in a same airspace as the UAV 104 to use the GPS correction value without having to determine a location of the ground structure 116 (or other ground structures) as discussed above. Sharing the GPS correction value may allow UAVs to reduce a frequency of determining locations of ground structures due to advantages of sharing this information between UAVs. Thus, as long as one UAV generates a GPS correction value within a predetermine range of time, it may be unnecessary for other UAVs to do the same during this specific predetermine range of time.

In some embodiments, the other UAVs 126 may determine their location at or near a given time using known ground structures as described above. The other UAVs 126 may communicate their temporal location (e.g., location and time of location) to a different UAV, such as the UAV 104, which may use the information to triangulate a location of the UAV 104. As long as three or more UAVs have known locations within a short period of time (often measured in seconds or less), then other UAVs in the area that receive this information can determine their own location based on time of flight of the information from the other UAVs and the content of that information using triangulation location techniques.

The UAV 104 may include a flight plan, which may be initially created by the service provider 110 and/or by the UAV 104 prior to flight of the UAV 104. The flight plan 128 is stored in memory of the UAV 104 and causes the UAV to fly to the destination 106, such as by traveling through waypoints tracked by a global positioning system (GPS) receiver of the UAV. Meanwhile a flight path may be the actual path or approximate path between particular waypoints. The flight plan 128 may include altitude information, and thus may be three-dimensional. For example, a flight plan may be created to cause a UAV to fly at a certain altitude over or near certain ground structures having known locations, such as the ground structure 116, to place the ground structure in a field of view of an imaging device. In some instances, the UAV 104 may deviate from the flight plan from time to time to capture imagery of a ground structure having a known location (e.g., the ground structure 116, etc.) to determine a location of the UAV 104 as described above. Many ground structures having known locations may exist along a flight plan, such as ground transmitters (e.g., the antenna 114), the destination 106, a house 130, and so forth.

Figure 2:
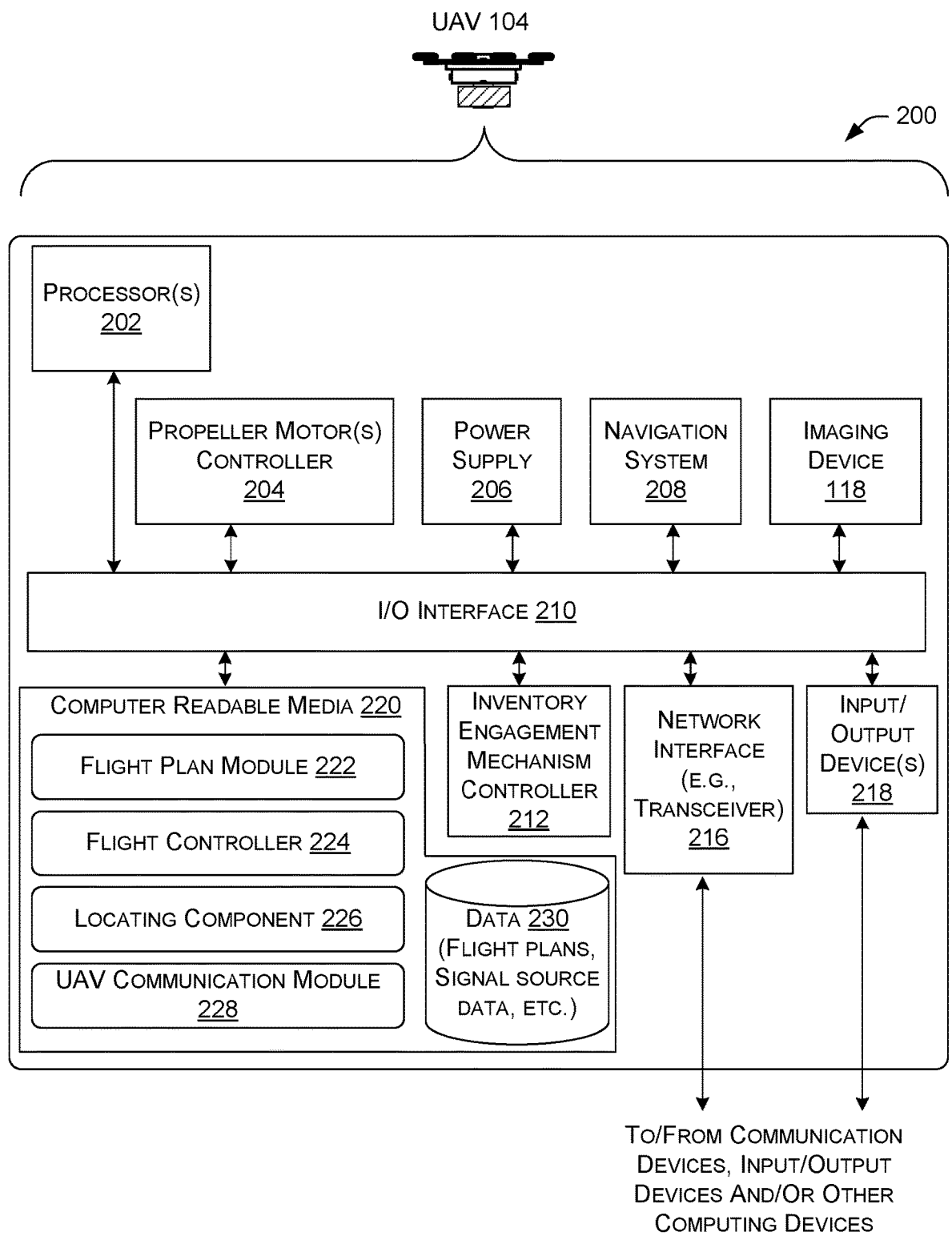
FIG. 2 is a block diagram of an illustrative UAV architecture.

FIG. 2 is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 220 via an input/output (I/O) interface 210. The UAV architecture 200 may also include a propeller motor controller 204, power supply module 206 and/or a navigation system 208. The UAV architecture 200 further includes an inventory engagement mechanism controller 212, an imaging device 118, a network interface 216, and one or more input/output devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 220 may be configured to store executable instructions/modules, data, flight paths, and/or data items accessible by the processor(s) 202. In various implementations, the non-transitory computer readable media 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 220 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 220, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The inventory engagement mechanism controller 212 communicates with the actuator(s) or motor(s) (e.g., a servo motor) used to engage and/or disengage inventory. For example, when the UAV is positioned over a level surface at a delivery location, the inventory engagement mechanism controller 212 may provide an instruction to a motor that controls the inventory engagement mechanism to release the inventory (e.g., an item or a package).

The imaging device 118 may capture imagery of a landscape from time to time. The imagery may include a ground structure having a known location. The imagery may be processed by a locating component 226 to determine a location of the UAV 104, as described below.

The network interface 216, such as a transceiver, may be configured to allow data to be exchanged between the UAV architecture 200, other devices attached to a network, such as other computer systems, and/or with UAV control systems of other UAVs. For example, the network interface 216 may enable wireless communication via signal sources and/or directly with other UAVs. In various implementations, the network interface 216 may support communication via wireless general data networks, such as a Wi-Fi network. For example, the network interface 216 may support communication via telecommunications networks such as cellular communication networks, satellite networks, and the like.

Input/output devices 218 may, in some implementations, include image capture devices, infrared sensors, time of flight sensors, accelerometers, lights, speakers, and other input/output devices commonly used in aviation. Multiple input/output devices 218 may be present and controlled by the UAV architecture 200. One or more of these sensors may be utilized to assist in landings as well as avoiding obstacles during flight.

In some embodiments, the computer readable media 220 may store a flight plan module 222, a flight controller 224, the locating component 226, and a UAV communication module, which are described in turn. The components may be stored together or in a distributed arrangement. The computer readable memory may also store data 230, such as a flight plan, signal source data, waypoints, predetermined landing sites, a weather forecast, and other data. The data 230 may include known locations for ground structures, such as ground structures likely to be encountered during the flight plan. The data 230 may include attributes of the ground structures, such as visual attributes and/or identifiers that can be used to identify the ground attributes and determine an orientation of the ground attribute relative to the UAV.

The flight plan module 222 may receive, maintain, update, and/or create a flight plan for use by the UAV, implemented by the flight controller 224 and navigation system. The flight plan module 222 may receive inputs from the signal source analyzer 226 and may update the flight plan (or create a new one) accordingly, which may include different waypoints and/or other different navigational information.

The flight controller 224 may implement the flight plan as well as control the UAV in accordance with the navigation system 208. The flight controller 224 may make changes in a direction or conduct of flight based on the information from the signal source analyzer 226 without necessarily receiving a change in the flight plan.

The locating component 226 may determine a location of the UAV 104 using any of the techniques described herein. In some embodiments, the locating component 226 may analyze imagery captured by the image device 118. This imagery may be analyzed by a feature recognition algorithm to identify the ground structure. The imagery may be used to determine an offset from a known location of a ground structure. To determine the offset, image analysis may be performed to determine a distance and orientation of the UAV relative to the known location of the grounds structure. The locating component 226 may create a GPS correction value by determining the difference between a GPS location and the imaged location of the UAV (both captured within a short time interval of less than a second or within a matter of seconds). The locating component 226 may use GPS correction value to adjust subsequent GPS locations received by the locating component 226, such as until a new GPS correction value is obtained by a similar process or from another UAV via a sharing process. In some embodiments, the locating component 226 may determine a location of the UAV in response to receiving location information from three or more UAVs that determine their location at or near a given time using known ground structures as described above (or otherwise know their location using other techniques). The locating component 226 may receive the temporal location (e.g., location and time of location) from the other UAVs, and may use the information to calculate a location of the UAV 104, such as by using triangulation techniques.

The UAV communication module 228 may perform communications operations with the service provider (controller) and/or with other UAVs. The UAV communication module 228 may send (transmit, broadcast) location information of the UAV 104 and/or the GPS correction value to other UAVs. The location information may be temporal location information that include a location and a time value. The UAV communication module 228 may receive location and time information from other UAVs, which may allow the UAV 104 to determine a location of the UAV 104, such as by using triangulation of the received information.

The data 230 may include the signal source data, which may be all of or a portion of data included in a signal source data repository created and/or maintained at least in part by a service provider. The data 230 may include a whitelist (which may be included in the signal source data) that designates trusted signal sources.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Additional information about the operations of the modules of the UAV 104 is discussed below with reference to the flow diagrams.

Figure 3:
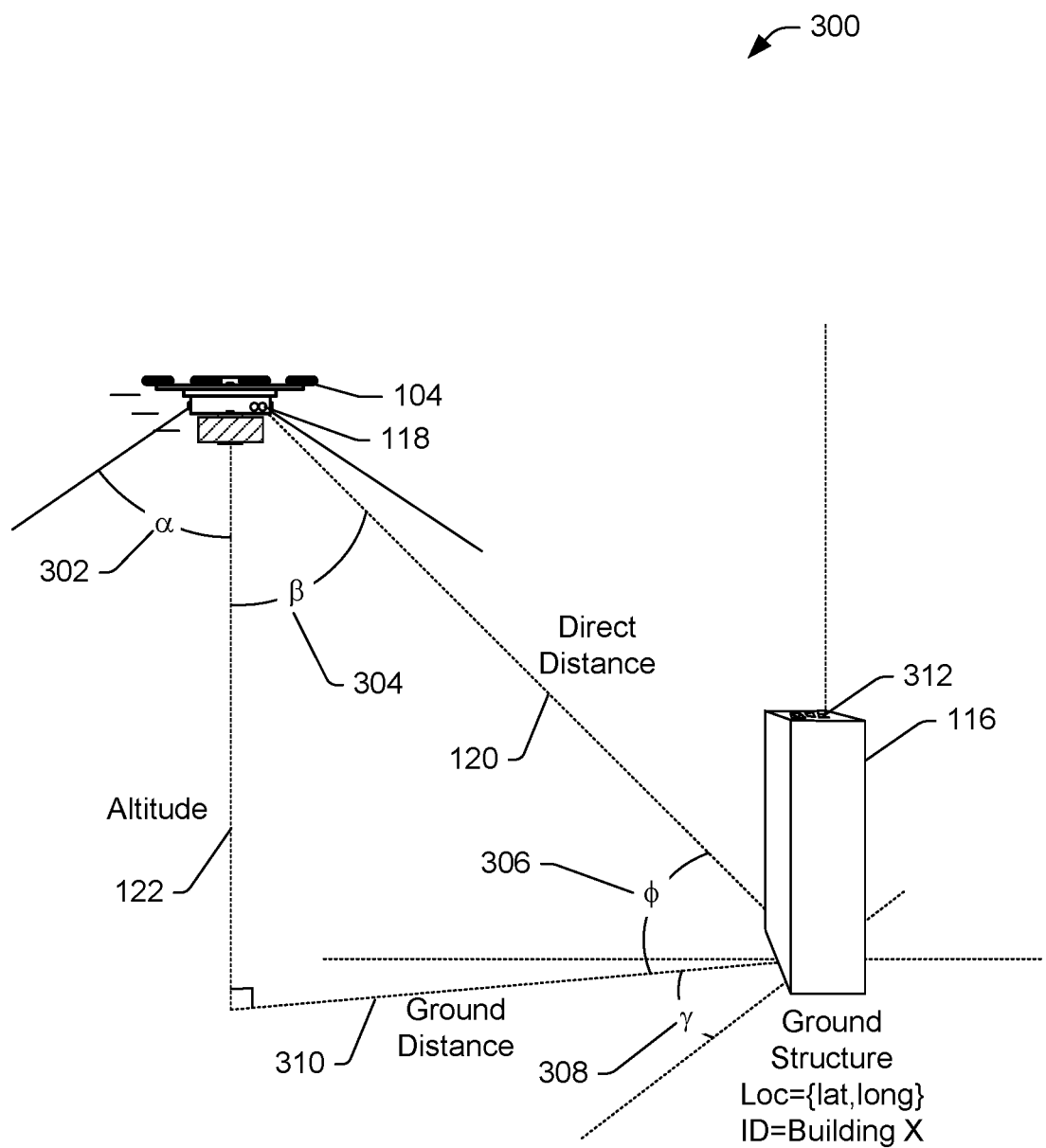
FIG. 3 is a schematic diagram showing illustrative determination of a location of a UAV based on imaging of a ground structure with a known location.

FIG. 3 is a schematic diagram showing illustrative UAV location 300 and determination of a location of a UAV based on imaging of a ground structure with a known location. The UAV 104 may view object under the UAV 104 during flight. The term "under" may represent a field of view (FOV) of approximately 60 degrees from straight down, shown as "α" 302, which when rotated about an axis perpendicular to the ground, creates a 120 degrees FOV downward from the UAV 104.

When the imaging device 118 captures image(s) of the ground structure, an image analysis algorithm may determine the distance 120 between the UAV 104 and the ground structure 116. Other information may be used to determine an orientation of the grounds structure relative to the UAV, including the altitude 122. The algorithm may use feature detection to determine a viewed perspective and angular location or orientation attributes, which may include angles "β" 304, "φ" 306, and "γ" 308, and/or a ground distance 310, at least some of which may be used to determine the offset location of the UAV relative to the known location of the ground structure 116. In some embodiments, the angle "φ" 306 may include compensation for the curvature of the earth. The ground location 310 may be a distance offset, which may be used to modify a latitude and longitude of the known location of the ground structure to determine the location of the UAV. The angular offset 124 may be determined from analyzing a perspective view of a three-dimensional shape of the ground structure or by analyzing other direction identifying information, such as markings 312 (e.g., indicia, fiducial marks, structure features, object features, etc.). As discussed above, shadows may be used to determine a perspective of the grounds structure when the general location and time are known.

The images may be used to determine a distance and angle from the ground structure when the ground structure is shown in a perspective view and has features that indicate orientation. As an example, the UAV 104 may fly over and near the ground structure 116 having a latitude/longitude of {47° 36' 23" N, 122° 19' 50" W} to place the ground structure in a field of view of an imaging device. Through image analysis, the offset may be calculated as a latitude/longitude (e.g., {1", 3"}), as a distance (e.g., (34 inches, 48 inches), or using other absolute measurements. Using this system, the UAV 104 may determine a current location of the UAV 104 at a given time (e.g., a temporal location value).

FIGS. 4 and 6-8 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 4:
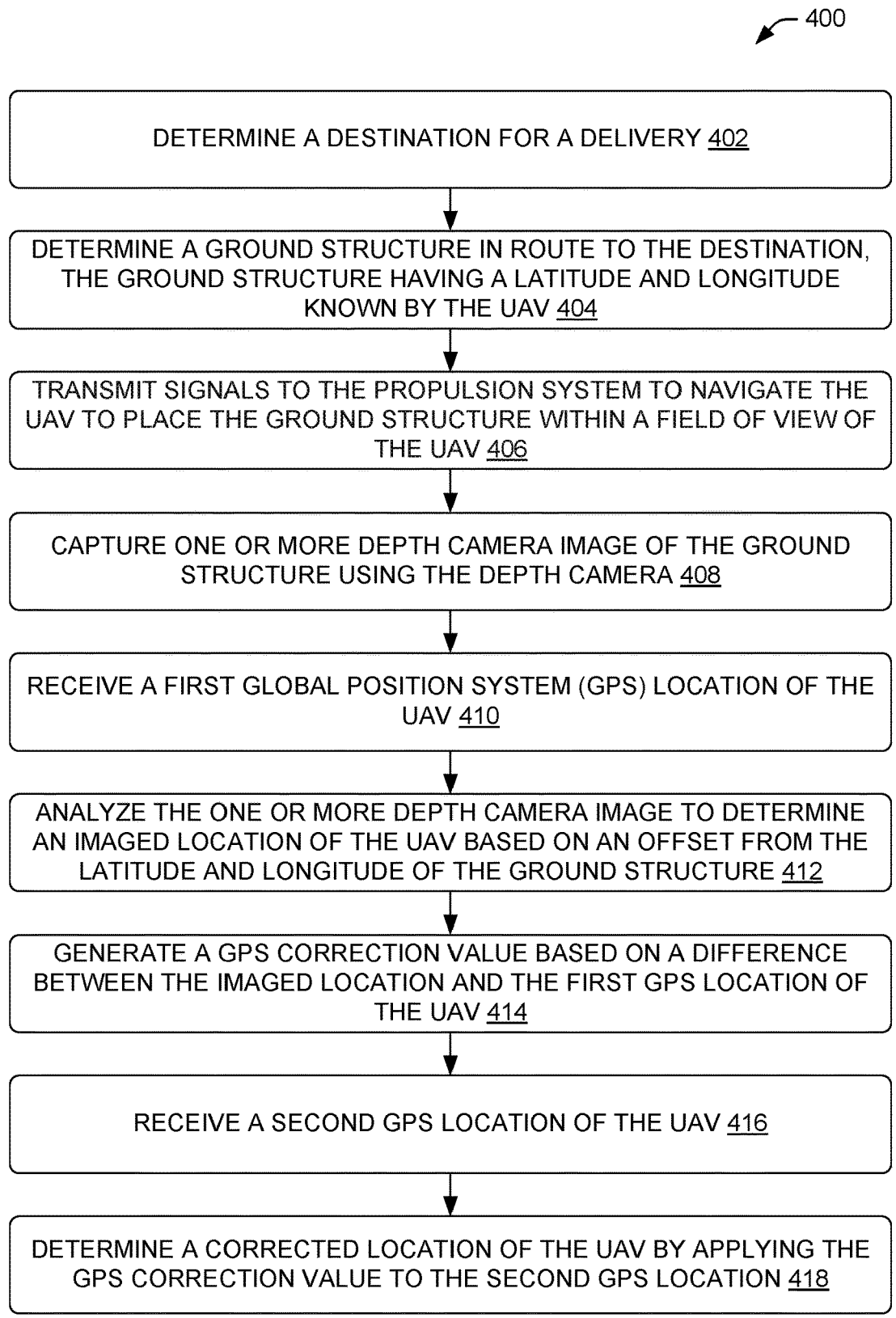
FIG. 4 is a flow diagram of an illustrative process to determine a location based on imaging a ground structure and create a GPS correction based on a difference between the location and a GPS location.

FIG. 4 is a flow diagram of an illustrative process 400 to determine a location based on imaging a ground structure and create a GPS correction based on a difference between the location and a GPS location. The process 400 is described with reference to at least the environment 100 and the architecture 200.

At 402, the UAV 104 may determine a destination for a delivery. For example, the UAV may be preloaded with a flight plan that specifies the destination, and possibly other information along a route, such as waypoints, observable grounds structures having known locations, and/or other information.

At 404, the UAV 104 may determine a ground structure in route to the destination. The ground structure having a latitude and longitude known by the UAV. For example, the UAV may determine, while in route to the destination, that a ground structure having a known location is observable and can be used to determine a location of the UAV at a given time, which may be used to correct a GPS location and/or used for other reasons discussed herein. The known location may be stored in a look up table by the UAV and/or accessibly from the service provider 110, from inspection of imagery (e.g., location is shown in image captured from ground location, such as from a marking on the ground structure, etc.).

At 406, the UAV 104 may transmit signals to the propulsion system to navigate the UAV to place the ground structure within a field of view of the UAV. In some embodiments, the UAV may deviate from the route within certain constraints and/or allowances to capture images of the ground structure.

At 408, the UAV 104 may capture one or more depth camera image of the ground structure using the depth camera. The depth camera may be a stereo camera and/or other type of camera(s) used to determine a distance of an object from the imaging device (camera). In various embodiments, a single camera may be used, which may capture multiple images for analysis to determine distance and/or angular orientation of the ground structure relative to the camera, thus enabling calculation of an offset distance of the camera from the ground location.

At 410, the UAV 104 may receive a first global position system (GPS) location of the UAV. The first GPS location may be used as a reference to create a GPS correction value. Often, GPS locations include small amounts of error due to various factors, which can be corrected to improve accuracy using a determined correction value.

At 412, the UAV 104 may analyze the one or more depth camera image to determine an imaged location of the UAV based on an offset from the latitude and longitude of the ground structure. For example, the offset may be determined using the techniques described above with reference to FIG. 3. Various algorithms can be used to analyze images to determine a location of the imaging device relative to the subject (e.g., a ground structure).

At 414, the UAV 104 may generate a GPS correction value based on a difference between the imaged location and the first GPS location of the UAV.

At 416, the UAV 104 may receive a second GPS location of the UAV. The second GPS location may include a same or similar error as the first GPS location received at the operation 410.

At 418, the UAV 104 may determine a corrected location of the UAV by applying the GPS correction value to the second GPS location. The corrected location may be used as a true or utilized location of the UAV. The UAV may share the true location of the UAV and/or the GPS correction value with other UAVs in accordance with some embodiments.

Figure 5:
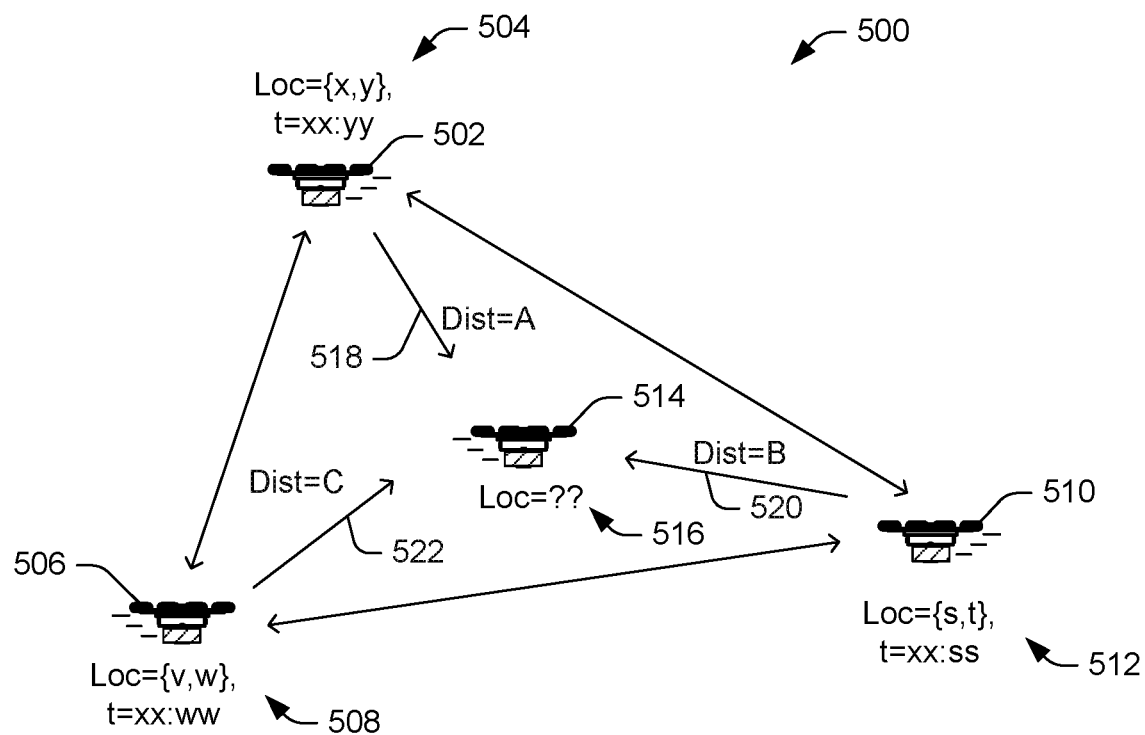
FIG. 5 is a schematic diagram of an illustrative environment including a plurality of UAVs exchanging temporal location information and providing the information to a different UAV to locate the different UAV.

FIG. 5 is a schematic diagram of an illustrative environment 500 including a plurality of UAVs exchanging temporal location information and providing the information to a different UAV to locate the different UAV.

The environment 500 may include at least a first UAV 502 that determines its location information 504 at a first time using the imaging techniques described above, a second UAV 506 that determines its location information 508 at a second time using the imaging techniques described above, and a third UAV 510 that determines its location information 512 at a third time using the imaging techniques described above. Each location information may be determined within a predetermined time period, such as within a second, or within a matter of seconds. This information may be transmitted to a different UAV 514, which may use the location information received from the three or more UAVs to determine a location 516 of the UAV 514, such as using triangulation algorithms. For example, the UAV 514 may determine a first distance 518 between the first UAV 504 and the UAV 514 based on a time of flight of transmission of the location information 504, may determine a second distance 520 between the second UAV 506 and the UAV 514 based on a time of flight of transmission of the location information 508, and may determine a third distance 522 between the third UAV 510 and the UAV 514 based on a time of flight of transmission of the location information 512. The first distance 518, the second distance 520, and the third distance 522, along with the location information 504, 508, and 512 may be used to determine the location of the UAV 514. In some embodiments, the UAV 514 may receive location data from each UAV individually. In various embodiments, the location information transmitted or broadcast by one of the UAVs may be determined using GPS receivers and/or by other locating techniques, including conventional locating techniques or any locating techniques described here.

As long as three or more UAVs have known locations at given times within a short period of time (often measured in seconds or less), then other UAVs in the area (e.g., the UAV 524) that receive this information can determine their own location based on time of flight of the information from the other UAVs and the content of that information using triangulation location techniques.

Figure 6:
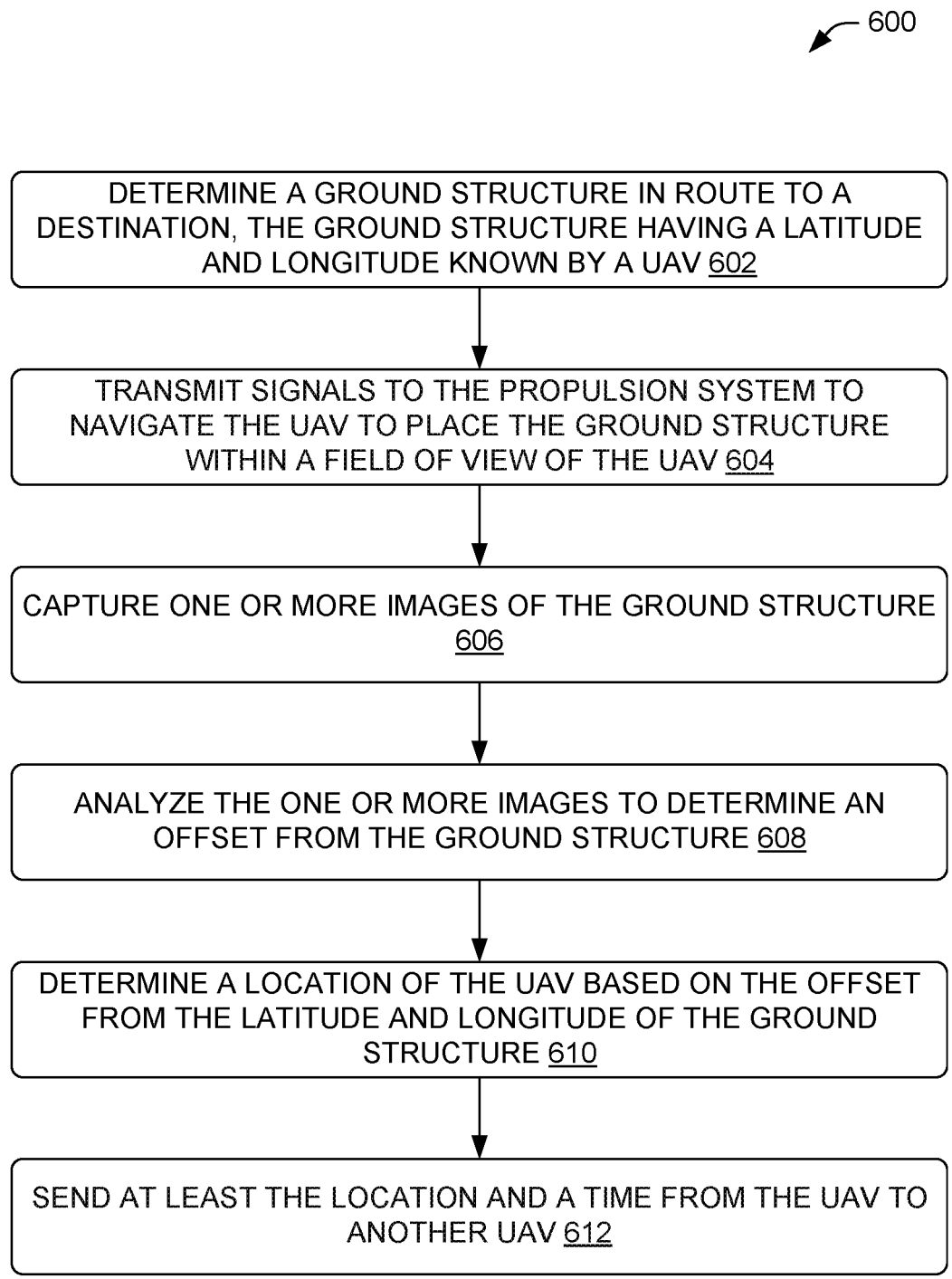
FIG. 6 is a flow diagram of an illustrative process to determine a location of a UAV based on imaging a ground structure and providing the location to another UAV.

FIG. 6 is a flow diagram of an illustrative process 600 to determine a location of a UAV based on imaging a ground structure and providing the location to another UAV. The process 600 is described with reference to at least the environments 100 and 500, and the architecture 200.

At 602, the UAV 104 may determine a ground structure in route to a destination, the ground structure having a latitude and longitude known by the UAV. For example, the UAV may know general locations of known ground structures or may analyze imagery captured during flight to identify and location known ground structures.

At 604, the UAV 104 may transmit signals to the propulsion system to navigate the UAV to place the ground structure within a field of view of the UAV. For example, the UAV may fly over the ground structure or near the ground structure and capture imagery of the ground structure that includes details to enable determination of an orientation of the ground structure relative to the UAV.

At 606, the UAV 104 may capture one or more images of the ground structure. For example, the UAV may capture a stereo image of the ground structure or images at different times.

At 608, the UAV 104 may analyze the one or more images to determine an offset from the ground structure. The UAV may use image analysis algorithms to determine the offset based on an observed perspective of the ground structure in the image(s) and/or based on depth calculations.

At 610, the UAV 104 may determine a location of the UAV based on the offset from the latitude and longitude of the ground structure. The location may be expressed as a latitude and longitude.

At 612, the UAV 104 may send at least the location and a time from the UAV to another UAV. The location may be used by other UAVs to determine their location, such as using triangulation as described with reference to FIG. 5. In some embodiments, the UAV 104 may send a GPS correction value based on the location.

Figure 7:
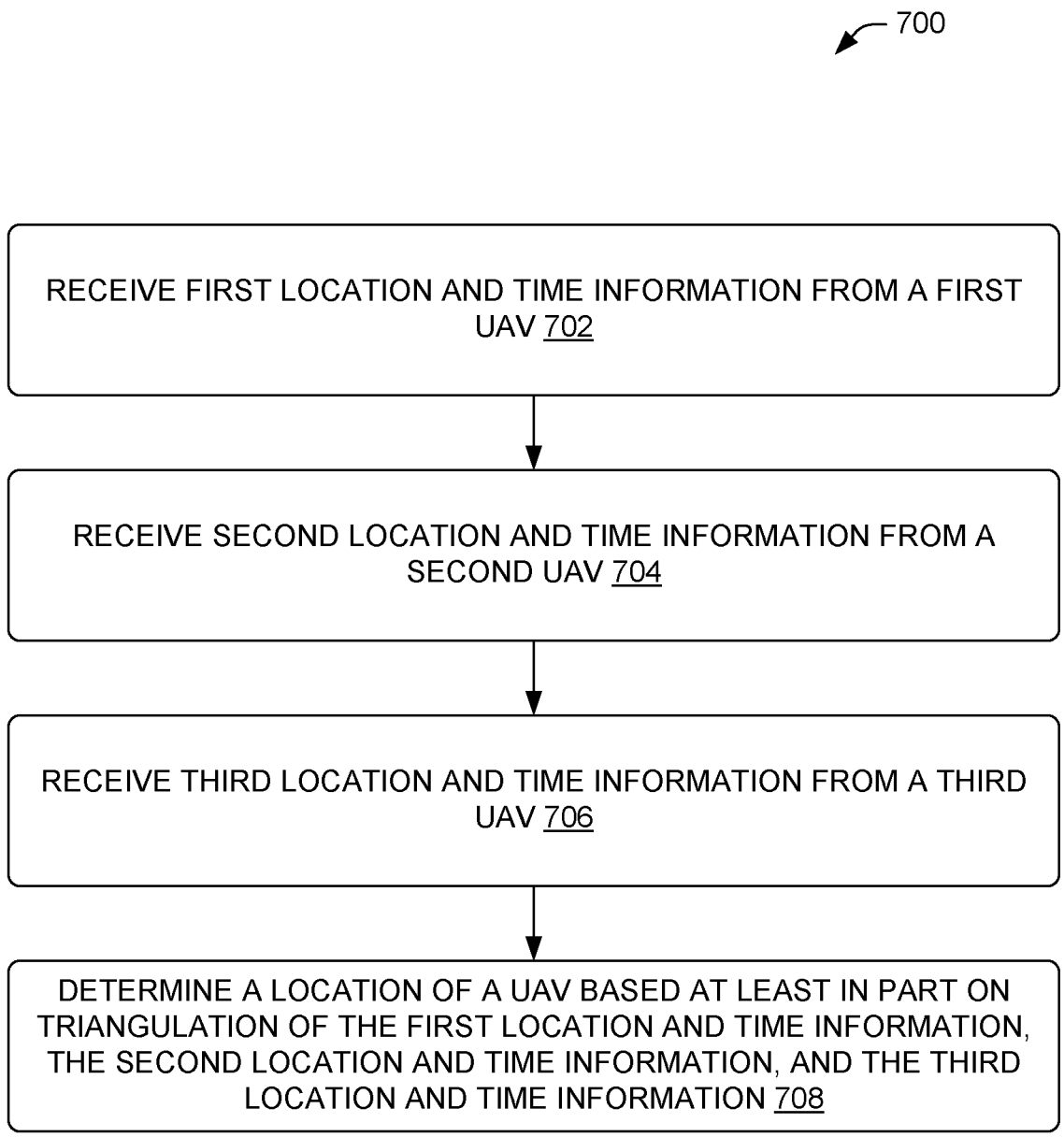
FIG. 7 is a flow diagram of an illustrative process to triangulate locations of UAVs to determine a location of a different UAV.

FIG. 7 is a flow diagram of an illustrative process 700 to triangulate locations of UAVs to determine a location of a different UAV. The process 400 is described with reference to at least the environment 100 and the architecture 200. The process 700 is described with reference to at least the environments 100 and 500, and the architecture 200.

At 702, the UAV 104 may receive first location and time information from a first UAV. The first location and time information may be determine using image techniques described herein and/or may be determined using conventional location techniques, such as GPS location.

At 704, the UAV 104 may receive second location and time information from a second UAV. The second location and time information may be determine using image techniques described herein and/or may be determined using conventional location techniques, such as GPS location.

At 706, the UAV 104 may receive third location and time information from a third UAV. The third location and time information may be determine using image techniques described herein and/or may be determined using conventional location techniques, such as GPS location.

At 708, the UAV 104 may determine a location of a UAV based at least in part on triangulation of the first location and time information, the second location and time information, and the third location and time information. For example, the UAV may determine a location by computing a distance from each of the UAVs based on time of flight of signals, and using those distances and the known locations of the respective UAVs to determine a location of the UAV.

Figure 8:
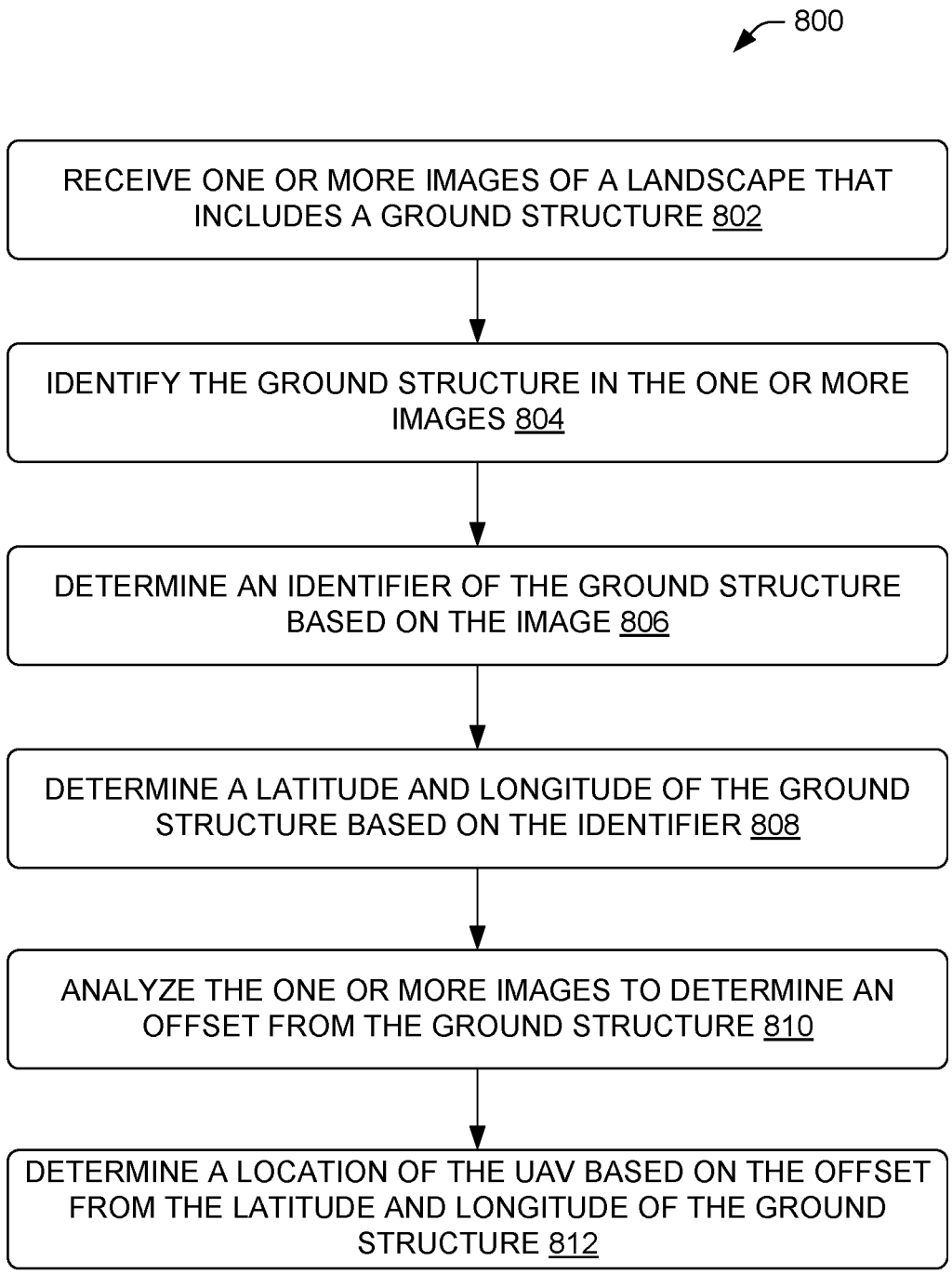
FIG. 8 is a flow diagram of an illustrative process to inspect one or more images to identify features for use in determining a location of a vehicle.

FIG. 8 is a flow diagram of an illustrative process 800 to inspect one or more images to identify features for use in determining a location of a vehicle. The process 400 is described with reference to at least the environment 100 and the architecture 200. The process 800 is described with reference to at least the environment 100 and the architecture 200.

At 802, the UAV 104 may receive one or more images of a landscape that includes a ground structure. The image(s) may include a relatively large field of view that includes additional ground structures and/or landscape in the image(s) besides the ground structure.

At 804, the UAV 104 may identify the ground structure in the one or more images. For example, object recognition algorithms may detect lines and/or shapes, which may be used to identify an known ground structure in an image.

At 806, the UAV 104 may determine an identifier of the ground structure based on the image. The identifier may be a physical feature of the ground structure, such as a unique shape like that of the Eiffel tower, Big Ben, etc. The identifier may be an intentional marking, such an image code, fiducial marking, etc. Other identifiers may be determined that enable associating a known location with the ground structure, such as via a look up table or other data repositories. In some embodiments, the known location may be "read" from the identifier, such as when the identifier includes the known location (e.g., a quick response (QR) code, etc.).

At 808, the UAV 104 may determine a latitude and longitude of the ground structure based on the identifier. For example, the identifier may be the known location or may enable access to the known location, such as via a look up table.

At 810, the UAV 104 may analyze the one or more images to determine an offset from the ground structure. The UAV may use image analysis algorithms to determine the offset based on an observed perspective of the ground structure in the image(s) and/or based on depth calculations.

At 812, the UAV 104 may determine a location of the UAV based on the offset from the latitude and longitude of the ground structure. The location may be expressed as a latitude and longitude.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A unmanned aerial vehicle (UAV) comprising:
a propulsion system;
a transceiver;
a camera; and
a controller in communication with at least the propulsion system, the transceiver, and the camera, the controller to execute computer-readable instructions to:
determine a destination for a delivery;
determine a ground structure in route to the destination, the ground structure having a latitude and a longitude accessible by the UAV;
determining a flight plan for the UAV to travel to the destination;
determining a deviation from the flight plan for the UAV to travel directly over the ground structure, the deviation corresponding to a first distance between the flight plan and the ground structure;
transmit, based at least in part on the deviation, signals to the propulsion system to navigate the UAV to place the ground structure within a field of view of the camera;
capture one or more images of the ground structure using the camera;
analyze the one or more images to determine an offset from the latitude and the longitude of the ground structure, the offset corresponding to at least one of a second distance between the UAV and the ground structure, an altitude of the UAV, or an angle associated with the ground structure and the UAV; and
determine a location of the UAV based at least in part on the offset from the latitude and the longitude of the ground structure.

2. The UAV as recited in claim 1, wherein the controller further executes computer-readable instructions to cause the transceiver to:
determine, from the one or more images, an imaged location of the UAV;
receive a global position system (GPS) location of the UAV;
generate a GPS correction value based at least in part on a difference between the imaged location and the GPS location of the UAV; and
send the GPS correction value to another UAV.

3. The UAV as recited in claim 1, wherein analysis of the one or more images includes computing an imaged latitude and longitude of the UAV based at least in part on one or more images.

4. The UAV as recited in claim 1, wherein analysis of the one or more images further includes (i) determining the second distance from the ground structure based at least in part on the one or more images, and (ii) determining a viewed perspective of the ground structure to determine an angular location between the ground structure and the UAV, and wherein the offset is based at least in part on the second distance and the angular location.

5. A computer-implemented method comprising:
determining a ground structure in route to a destination, the ground structure having a latitude and a longitude accessible by an unmanned aerial vehicle (UAV);
determining a flight plan for the UAV to travel to the destination;
determining a deviation from the flight plan for the UAV to travel directly over the ground structure, the deviation corresponding to a first distance between the flight plan and the ground structure;
transmitting, based at least in part on the deviation, one or more signals to a propulsion system of the UAV to navigate the UAV to place the ground structure within a field of view of the UAV;
causing the UAV to capture one or more images of the ground structure;
analyzing the one or more images to determine an offset from the ground structure, the offset corresponding to at least one of a second distance between the UAV and the ground structure, an altitude of the UAV, or an angle associated with the ground structure and the UAV; and
determining a location of the UAV based at least in part on the offset from the latitude and the longitude of the ground structure.

6. The computer-implemented method as recited in claim 5, further comprising broadcasting at least the location of the UAV to other UAVs flying in a common airspace.

7. The computer-implemented method as recited in claim 5, further comprising:
receiving first location and time information from a first UAV;
receiving second location and time information from a second UAV;
receiving third location and time information from a third UAV; and
determining a subsequent location of the UAV based at least in part on triangulation of the first location and time information, the second location and time information, and the third location and time information.

8. The computer-implemented method as recited in claim 5, further comprising:
receiving a first global position system (GPS) location of the UAV; and
generating a GPS correction value based at least in part on a difference between the location and the first GPS location of the UAV.

9. The computer-implemented method as recited in claim 8, further comprising
receiving a second GPS location of the UAV; and determining a corrected location of the UAV by applying the GPS correction value to the second GPS location.

10. The computer-implemented method as recited in claim 5, further comprising reading an identifier of the ground structure to determine the latitude and the longitude of the ground structure.

11. The computer-implemented method as recited in claim 5, further comprising using image recognition to map the ground structure with a known ground structure associated with the latitude and the longitude.

12. The computer-implemented method as recited in claim 5, wherein the analyzing the one or more images further includes:
    determining the second distance based at least in part on the one or more images, and
    determining a viewed perspective of the ground structure to determine an angular location between the ground structure and the UAV,
    wherein the offset is based at least in part on the second distance and the angular location.

13. The computer-implemented method as recited in claim 5, further comprising:
    receiving a global position system (GPS) location of the UAV; and
    determining that the GPS location is illegitimate based at least in part on a difference between the GPS location and the location of the UAV at a time.

14. The computer-implemented method as recited in claim 5, further comprising:
    detecting, from the one or more images, a shadow cast by the ground structure;
    determining, from the one or more images and based at least in part on the shadow, an orientation of the ground structure; and
    determining the offset based at least in part on the shadow and the orientation.

15. The computer-implemented method as recited in claim 5, further comprising:
    transmitting, based at least in part on the deviation, one or more second signals to the propulsion system to cause the UAV to navigate to a position directly over the ground structure; and
    causing the UAV to capture one or more second images of the ground structure while the UAV is directly over the ground structure.

16. A device comprising:
    one or more processors; and
    memory storing one or more computer-readable instructions that, when executed by the one or more processors, cause the one or more processors to perform acts including:
    identifying a landscape that includes a ground structure;
    determining a flight plan for the device to travel to a destination;
    determining a deviation from the flight plan for the device to travel directly over the ground structure, the deviation corresponding to a first distance between the flight plan and the ground structure;
    causing, based at least in part on the deviation, the device to navigate in a direction such that the ground structure is placed within a field of view of the device;
    identifying the ground structure in one or more images captured by the device;
    determining a latitude and a longitude of the ground structure;
    analyzing the one or more images to determine an offset from the ground structure, the offset corresponding to at least one of a second distance between the device and the ground structure, an altitude of the device, or an angle associated with the ground structure and the device; and
    determining a location of the device based at least in part on the offset from the latitude and the longitude of the ground structure.

17. The device as recited in claim 16, wherein the acts further comprise transmitting at least the location of the device to another device.

18. The device as recited in claim 16, wherein the acts further comprise:
    receiving a global position system (GPS) location of the device; and
    generating a GPS correction value based at least in part on a difference between the location and the GPS location of the device.

19. The device as recited in claim 18, wherein the acts further comprise sending the GPS correction value to another device.

20. The device as recited in claim 16, wherein the acts further comprise determining an identifier of the ground structure based at least in part on the image and a feature recognition algorithm to positively identify the ground structure.

* * * * *